(12) United States Patent
Zhang et al.

(10) Patent No.: US 10,286,466 B2
(45) Date of Patent: May 14, 2019

(54) WORKING ATTACHMENT AND COMBINATION OF WORKING ATTACHMENT AND POWER TOOL

(71) Applicant: CHERVON (HK) LIMITED, Wanchai (HK)

(72) Inventors: Xiaofeng Zhang, Nanjing (CN); Huaqing Chen, Nanjing (CN); Dong Cao, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 159 days.

(21) Appl. No.: 15/391,973

(22) Filed: Dec. 28, 2016

(65) Prior Publication Data

US 2017/0348780 A1 Dec. 7, 2017

(30) Foreign Application Priority Data

Jun. 3, 2016 (CN) .......................... 2016 1 0394497
Aug. 10, 2016 (CN) ...................... 2016 2 0861792 U

(51) Int. Cl.
*B24B 23/04* (2006.01)
*B23D 61/00* (2006.01)
*B27B 19/00* (2006.01)
*B27B 5/32* (2006.01)

(52) U.S. Cl.
CPC ............ *B23D 61/006* (2013.01); *B24B 23/04* (2013.01); *B27B 5/32* (2013.01); *B27B 19/006* (2013.01)

(58) Field of Classification Search
CPC ......... B27B 19/006; B27B 5/32; B24B 23/04; B23D 61/006; Y10T 279/33; B23B 31/10; B23B 31/19
See application file for complete search history.

(56) References Cited

U.S. PATENT DOCUMENTS 8,616,562 B2 * 12/2013 Maras ....................... B25F 3/00
279/143
9,044,874 B2 * 6/2015 Zhang ....................... B27B 5/32

FOREIGN PATENT DOCUMENTS

DE 202013006900 U1 * 11/2015 ........... B23D 61/006
WO WO 2015132019 A1 * 9/2015 ........... B23D 61/006

* cited by examiner

*Primary Examiner* — Daniel Howell
*Assistant Examiner* — Paul M Janeski
(74) *Attorney, Agent, or Firm* — Greenburg Traurig, LLP

(57) ABSTRACT

A working attachment for a power tool is provided. The working attachment is able to be driven by the power tool to oscillate around a central axis. The working attachment includes a working portion for realizing a function of the working attachment and a connecting portion for connecting the working attachment with the power tool. The connecting portion includes at least two driven points for receiving a driving force of the power tool. The at least two driven points are disposed in a plane which is substantially perpendicular to the central axis and located between an upper end and a lower end of the connecting portion in a direction of the central axis.

15 Claims, 18 Drawing Sheets

WORKING ATTACHMENT AND COMBINATION OF WORKING ATTACHMENT AND POWER TOOL

RELATED APPLICATION INFORMATION

This application claims the benefit under 35 U.S.C. § 119(a) of Chinese Patent Application No. CN 201610394497.9, filed on Jun. 3, 2016, and Chinese Patent Application No. CN 201620861792.6, filed on Aug. 10, 2016, each of which is incorporated herein by reference in its entirety.

FIELD OF THE DISCLOSURE

The present disclosure relates generally to power tools and, more particularly, to an oscillating tool.

BACKGROUND OF THE DISCLOSURE

Multi-functional tools, also known as oscillating tools, include a motor for driving a working attachment to oscillate back and forth so as to realize the function of an oscillating tool. The working attachments adapted for use with multi-functional tools generally include a saw blade, a grinding disc, and so on.

However, the engagement between currently known power tools and the working attachment is not reliable and can easily become loose.

The statements in this section merely provide background information related to the present disclosure and may not constitute prior art.

SUMMARY

In one aspect of the disclosure, a working attachment for a power tool is provided. The working attachment is able to be driven by the power tool to oscillate around a central axis. The working attachment includes a working portion for realizing a function of the working attachment and a connecting portion for connecting the working attachment with the power tool. The connecting portion includes at least two driven points for receiving a driving force of the power tool. The at least two driven points are disposed in a plane which is substantially perpendicular to the central axis and located between an upper end and a lower end of the connecting portion in a direction of the central axis.

In another aspect of the disclosure, a working attachment for a power tool is provided. The working attachment is able to be driven by the power tool to oscillate around a central axis. The working attachment includes a working portion for realizing a function of the working attachment and a connecting portion for connecting the working attachment with the power tool. The connecting portion includes a top seat for making the connecting portion be fixed relative to the power tool in the direction of the central axis, a bottom seat for fixedly connecting the working portion with the connecting portion where the bottom seat is formed with a hole through which the central axis passes, and a driven structure for receiving a driving force of the power tool so that the working attachment is capable of oscillating around the central axis. The driven structure is arranged between the top seat and the bottom seat and a point of a projection of the driven structure on a plane substantially perpendicular to the central axis which is farthest from the central axis is located within a projection of the hole on the plane.

In yet another aspect of the disclosure, a combination includes a power tool and a working attachment. The power tool includes an attachment mounting device for connecting and driving the working attachment to rotate around a central axis. The working attachment includes a working portion for realizing a function of the working attachment and a connecting portion for connecting the working attachment with the power tool. The connecting portion includes at least two driven points for receiving a driving force of the power tool. The at least two driven points are disposed in a plane which is substantially perpendicular to the central axis and located between an upper end and a lower end of the connecting portion in a direction of the central axis.

Further areas of applicability will become apparent from the description provided herein. It should be understood that the description and specific examples are intended for purposes of illustration only and are not intended to limit the scope of the invention hereinafter claimed.

The drawings described herein are for illustrative purposes only of selected embodiments and not all possible implementations, and are not intended to limit the scope of

DETAILED DESCRIPTION

The following description of the preferred embodiments is merely exemplary in nature and is in no way intended to limit the invention hereinafter claimed, its application, or uses.

Figure 1:
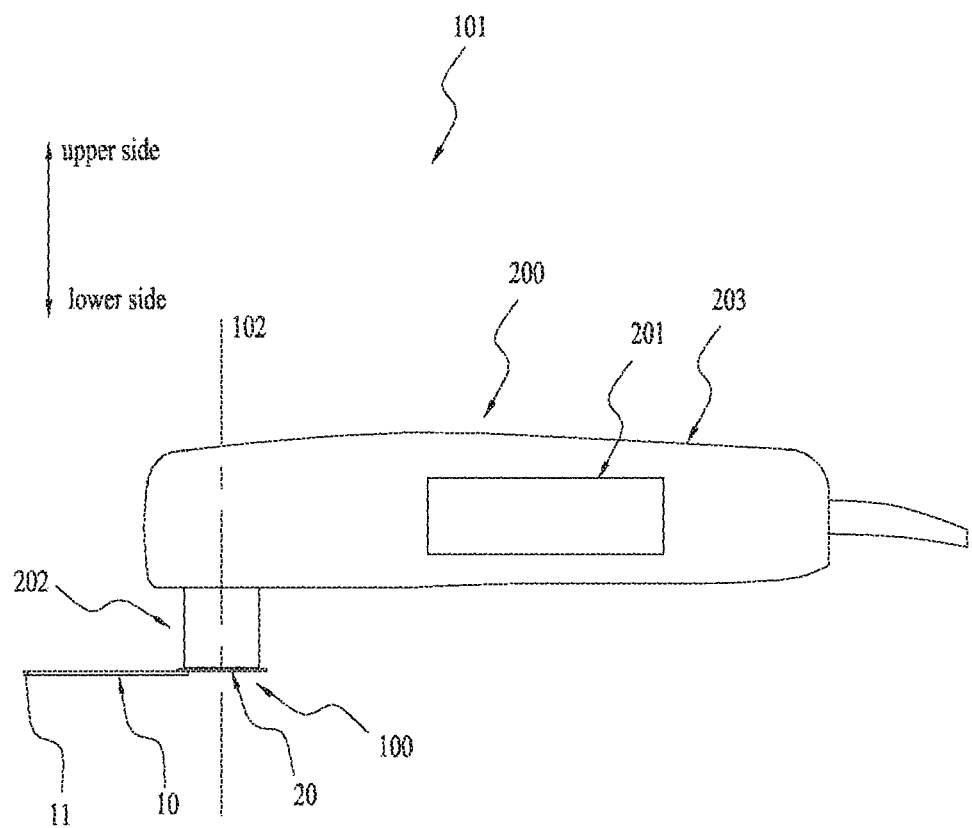
FIG. 1 is a schematic view of an exemplary combination of a power tool and a working attachment.
Figure 2:
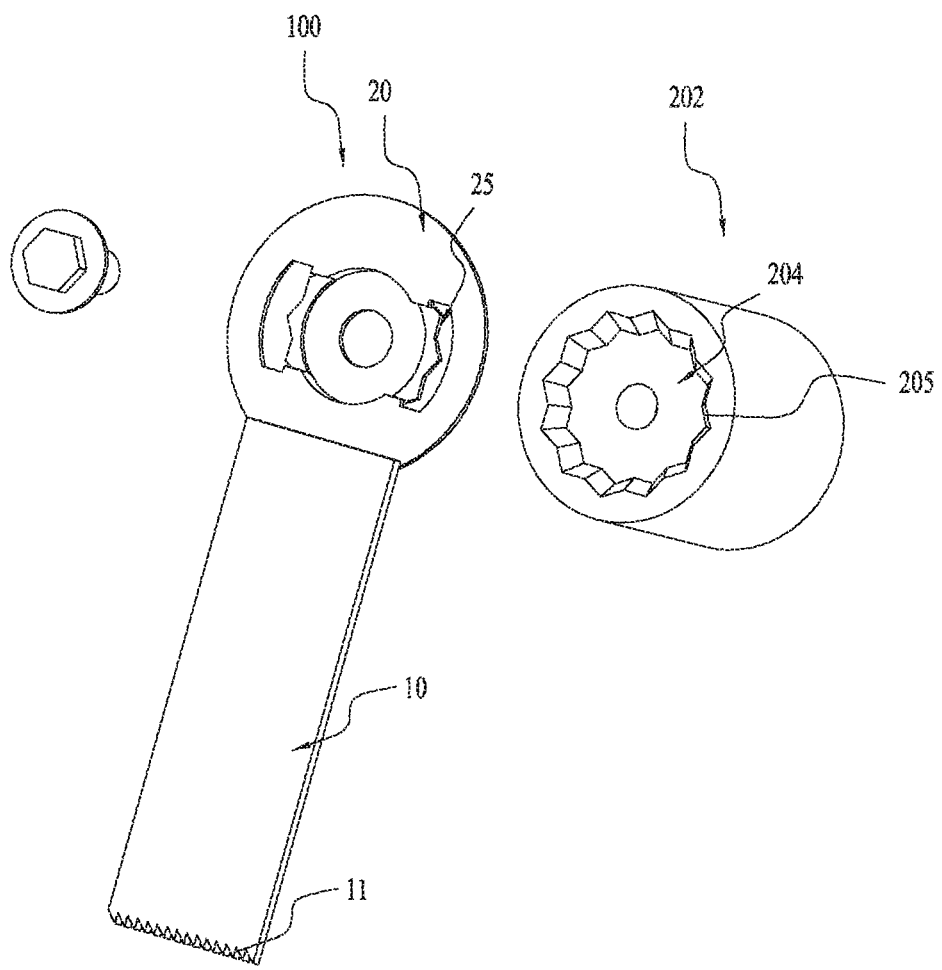
FIG. 2 an exploded view of the working attachment and an attachment mounting device in FIG. 1.
Figure 3:
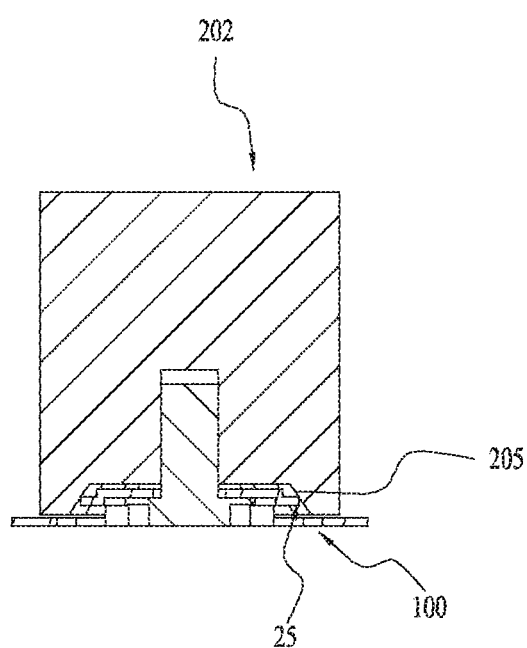
FIG. 3 is a sectional view of the working attachment and the attachment mounting device in FIG. 1, wherein the working attachment and the attachment mounting device are connected with each other.
Figure 4:
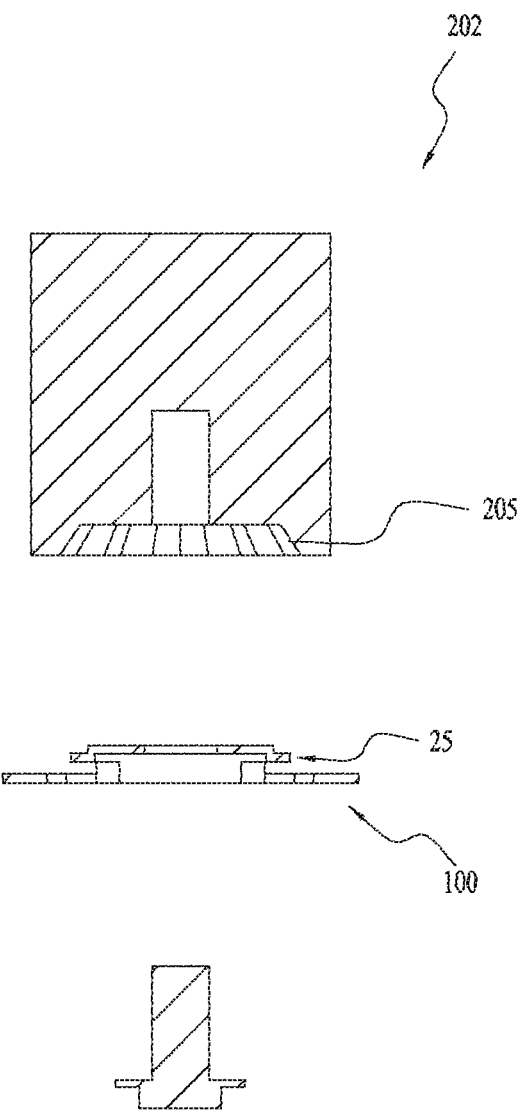
FIG. 4 is another sectional view of the working attachment and the attachment mounting device in FIG. 1, wherein the working attachment and the attachment mounting device are separated from each other.

Referring to FIGS. 1-2, a combination 101 includes a working attachment 100 and a power tool 200. The power tool 200 can drive the working attachment 100 to rotate in a certain angle range so as to realize a reciprocating oscillation. The power tool 200 includes a motor 201, an attachment mounting device 202 and a handle 203. Specifically, the motor 201 is used to drive the attachment mounting device 202, and the working attachment 100 is mounted on the attachment mounting device 202. The attachment mounting device 202 is connected with the working attachment 100 so as to drive the working attachment 100 to operate. The handle 203 is provided for a user to grip. The power tool 200 is an oscillating tool. For convenience of illustration, as shown in FIG. 1, in a direction of a central axis 102, an end of the power tool 200 is defined as an upper side, and an end of the working attachment 100 is defined as a lower side.

Figure 5:
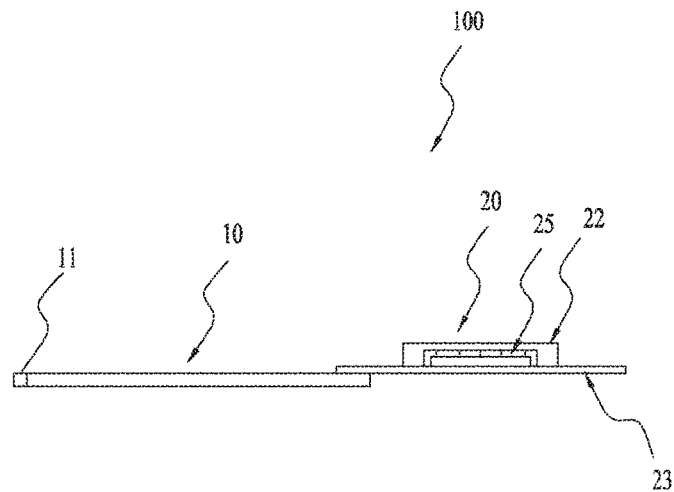
FIG. 5 is a plane view of the working attachment in FIG. 1.

Referring to FIGS. 1-2, the working attachment 100 includes a working portion 10 and a connecting portion 20. The working portion 10 is used to realize a function of the working attachment 100, and can have different structures so as to realize different functions. For example, as shown in FIG. 5, the working portion 10 has saw teeth 11 so that the working attachment 100 can realize the function of sawing. Here, the working attachment 100 can be called a saw blade. In another embodiment, the working portion 10 has a grinding structure so as to realize the function of grinding. The connecting portion 20 is used to connect the working attachment 100 to the attachment mounting device 202 of the power tool 200. Specifically, the attachment mounting device 202 is provided with a mounting structure 204 for mounting the working attachment 100. The connecting portion 20 of the working attachment 100 is connected with the mounting structure 204.

Referring to FIGS. 1-6, the connecting portion 20 includes a top seat 22, a bottom seat 23 and a driven structure 25. The top seat 22 is configured to make the connecting portion 20 be fixed relative to the power tool 200 in the direction of the central axis 102. The bottom seat 23 is configured to fixedly connect the working portion 10 with the connecting portion 20. The driven structure 25 is configured to receive a driving force of the power tool 200 so that the working attachment 100 can rotate around the central axis 102, which is arranged between the top seat 22 and the bottom seat 23. The attachment mounting device 202 is formed with a driving surface 205 for engaging with the driven structure 25. The driving surface 205 can contact with the driven structure 25 so as to transfer the driving force to the working attachment 100.

Figure 6:
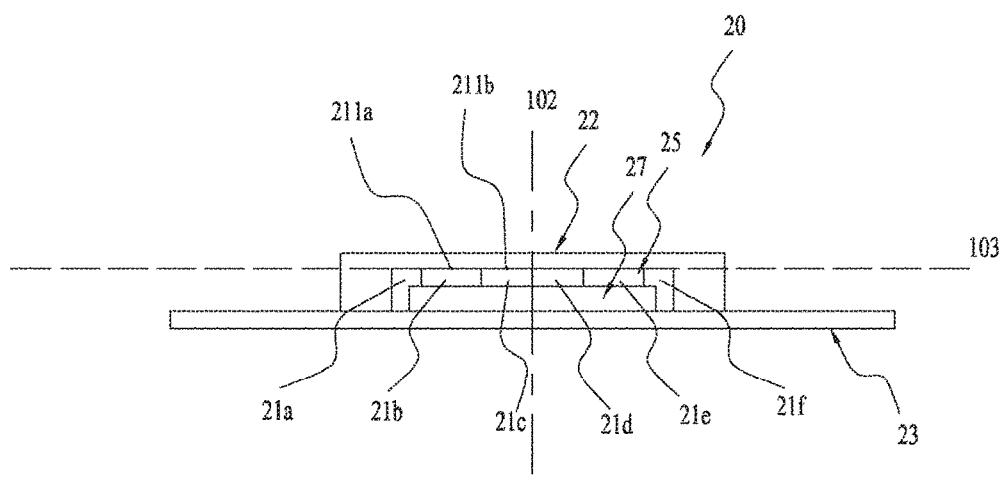
FIG. 6 is a plane view of a connecting portion of the working attachment in FIG. 5.
Figure 7:
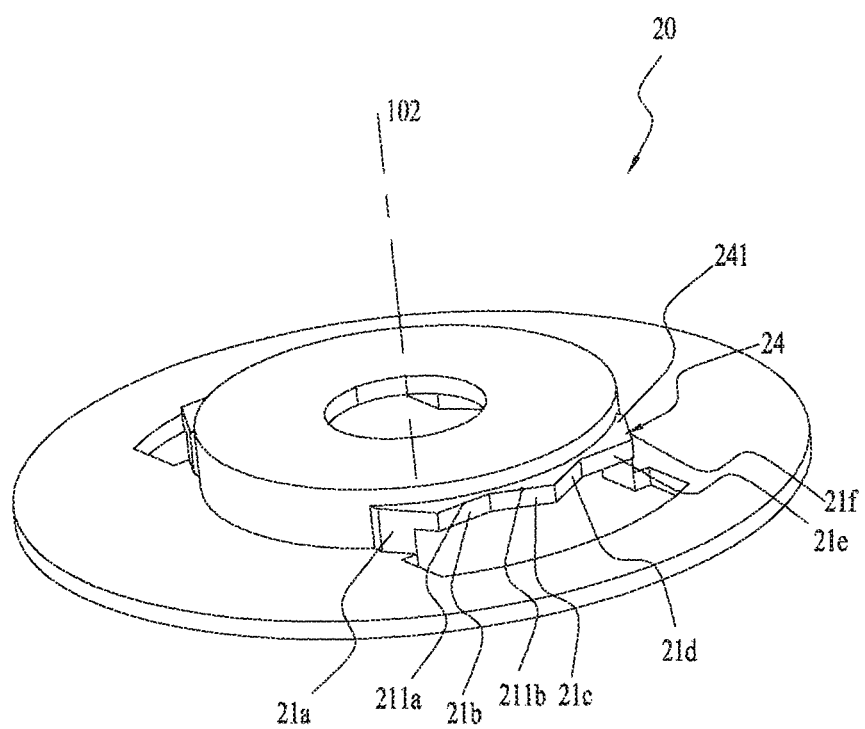
FIG. 7 is a schematic view of the connecting portion of the working attachment in FIG. 5.

The connecting portion 20 is formed with a plurality of driven surfaces which constitute the driven structure 25, and the plurality of driven surfaces is formed with driven points. Referring to FIGS. 6-7, the connecting portion 20 is formed with six driven surfaces 21a, 21b, 21c, 21d, 21e, 21f which are arranged between the top seat 22 and the bottom seat 23. The connecting portion 20 includes a step structure 24 which is located on an edge of the top seat 22. The step structure 24 includes a step surface 241 which is substantially perpendicular to the central axis 102. The step surface 241 intersects with the six driven surfaces 21a, 21b, 21c, 21d, 21e, 21f to form intersecting ridges which are sets of the driven points. Any point of the intersecting ridges can be considered as the driven point. The driven point is a point that is able to receive the driving force of the power tool 200. Specifically, the driven point can contact with the driving surface 205 so that the driving surface 205 transfers the driving force to the driven point.

Referring to FIGS. 5-7, an angle between each driven surface 21a, 21b, 21c, 21d, 21e, 21f and the central axis 102 is greater than or equal to 0 degree and less than or equal to 30 degrees. Specifically, each driven surface 21a, 21b, 21c, 21d, 21e, 21f is extended in a direction parallel to the central axis 102. That is, the angle between each driven surface 21a, 21b, 21c, 21d, 21e, 21f and the central axis 102 is equal to 0 degree.

The connecting portion 20 includes at least two driven points and it can realize a reciprocating motion of the working attachment 100 driven by the power tool 200. Referring to FIGS. 6-7, taking the driven points 211a, 211b as an example, the driven points 211a, 211b are formed by the driven surfaces 21b, 21c respectively and located on edges of the driven surfaces 21b, 21c respectively. Specifically, the driven point 211a is located on the intersecting ridge of the driven surface 21b and the step surface 241, and the driven point 211b is located on the intersecting ridge of the driven surface 21c and the step surface 241. The driven points 211a, 211b are used to receive the driving force of the power tool 200. The driving force of the power tool 200 is transferred to the working attachment 100 through the driven points 211a, 211b so that the power tool 200 can drive the working attachment 100 to operate. The driven points 211a, 211b are arranged in a plane 103 which is substantially perpendicular to the central axis 102 and located between an upper end and a lower end of the connecting portion 20 in the direction of the central axis 102. Here, the upper and lower ends can refer to the upper and lower sides in FIG. 1. Specifically, the step surface 241 is in the plane 103, which is located between the upper end and the lower end of the connecting portion 20. The driven points 211a, 211b are arranged in the step surface 241.

As shown in FIG. 6, in the direction of the central axis 102, lower edges of the driven surfaces 21a, 21b, 21c, 21d, 21e, 21f do not contact with the bottom seat 23, so a gap 27 is formed between the driven surfaces 21a, 21b, 21c, 21d, 21e, 21f and the bottom seat 23.

Figure 8:
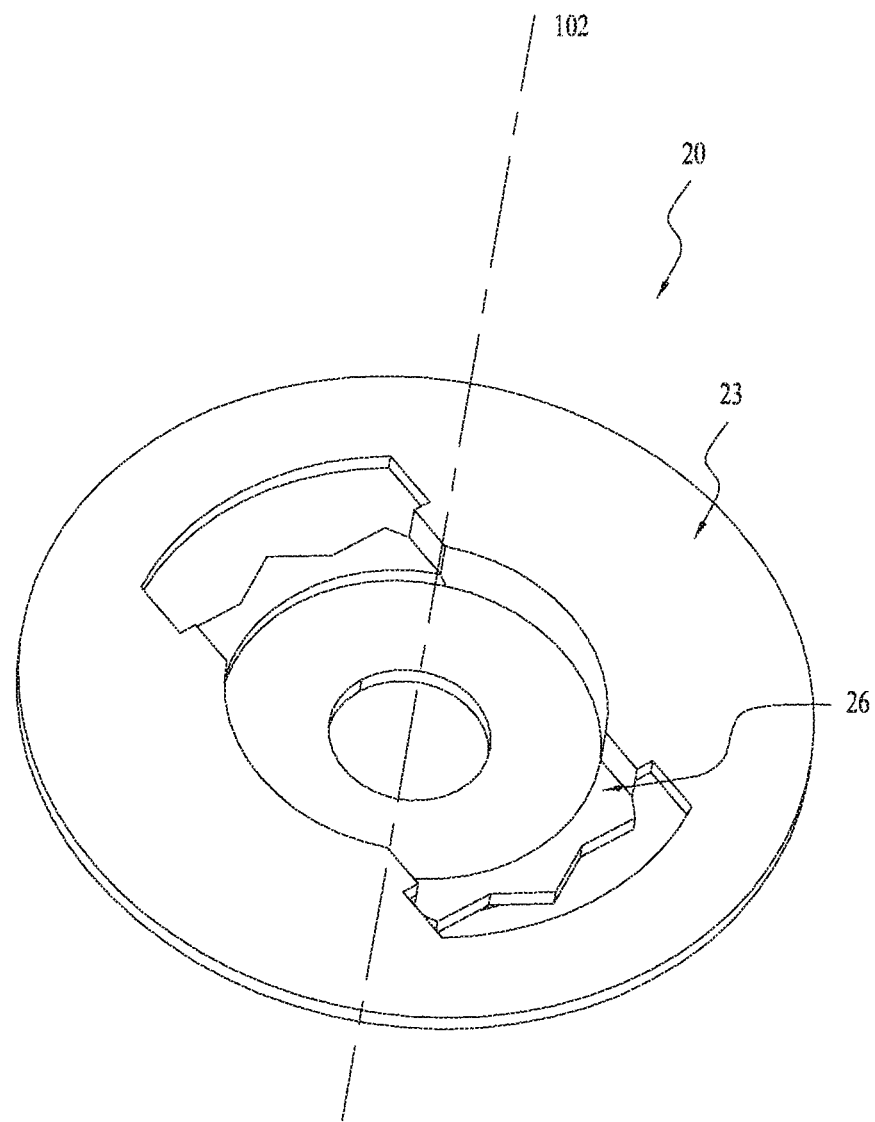
FIG. 8 is a further schematic view of the connecting portion of the working attachment in FIG. 5 from another perspective.
Figure 9:
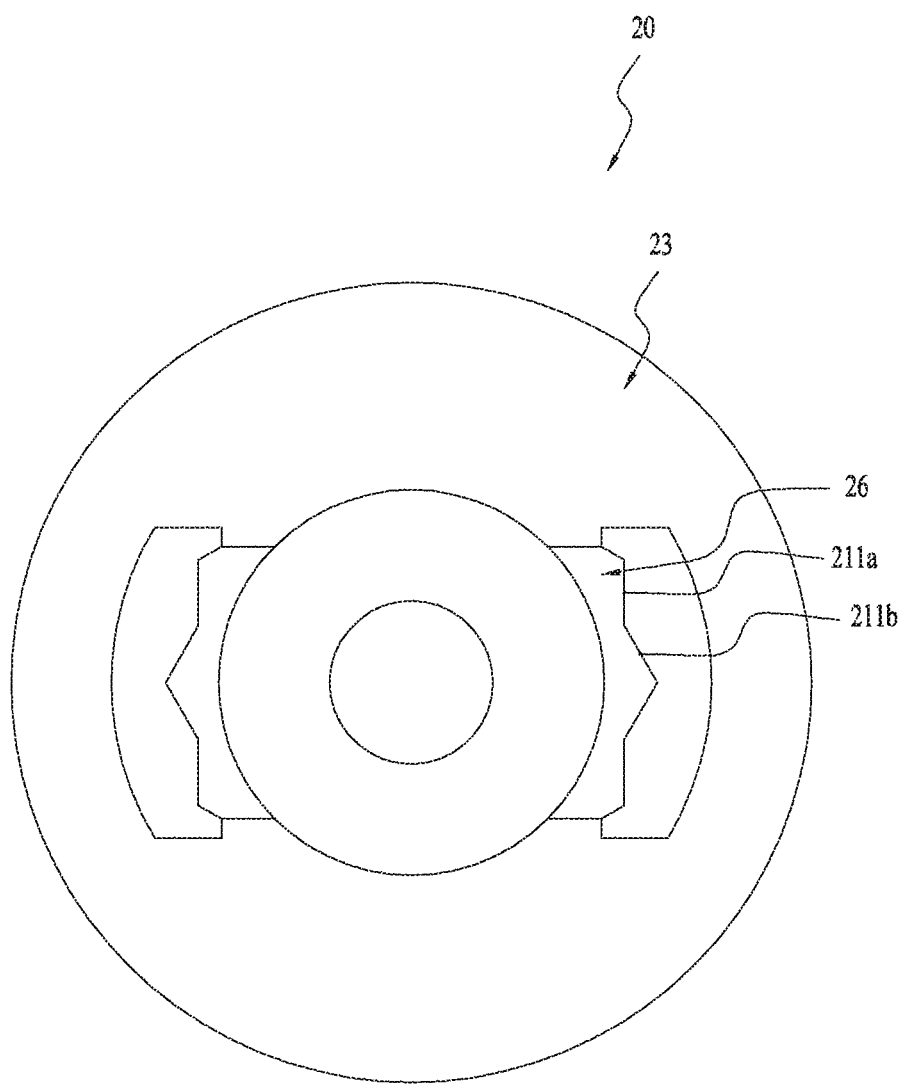
FIG. 9 is a bottom view of the connecting portion of the working attachment in FIG. 5.

Referring to FIGS. 8-9, the bottom seat 23 is formed with a hole 26, and the central axis 102 passes through the hole 26. In a plane that is substantially perpendicular to the central axis 102, a point of a projection of the driven structure 25 on the plane which is farthest from the central axis 102 is located within a projection of the hole 26 on the plane. The hole 26 goes through the bottom seat 23 outside the top seat 22 in the direction of the central axis 102. The hole 26 makes the connecting portion 20 be at least partially open in the direction of the central axis 102, and the open portion is outside the top seat 22.

Figure 10:
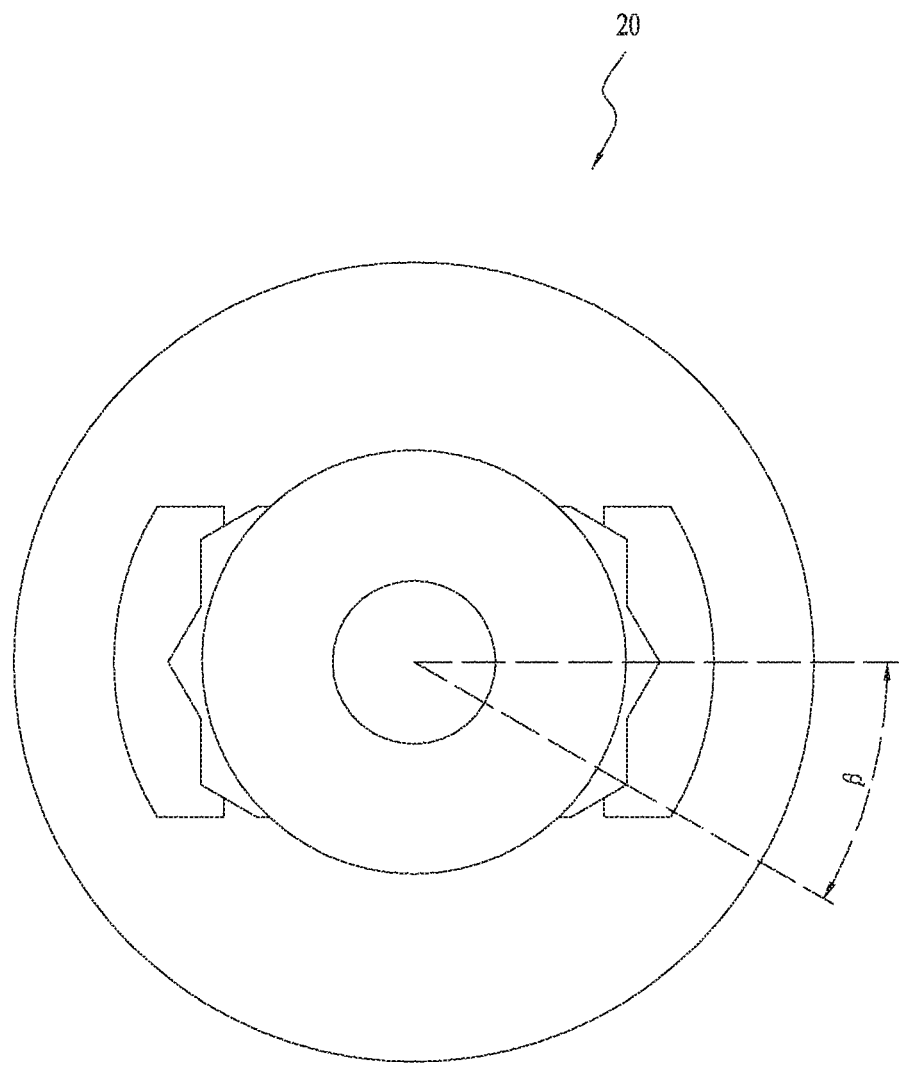
FIG. 10 is a top view of the connecting portion of the working attachment in FIG. 5.

Referring to FIGS. 6, 7 and 10, a first angle is formed between the two driven surfaces 211a and 211b, a second angle is formed between the two driven surfaces 211c and 211d, and a third angle is formed between the two driven surfaces 211e and 211f. A first connecting line connects an endpoint of the first angle and the central axis 102 and a second connecting line connects an endpoint of the second angle and the central axis 102 have an angle β which is greater than or equal to 20 degrees and less than or equal to 40 degrees. Specifically, the angle β is greater than or equal to 25 degrees and less than or equal to 35 degrees. In this embodiment, the angle β is 30 degrees. The first, second and third angles which protrude outward in a radial direction are 120 degrees.

Figure 11:
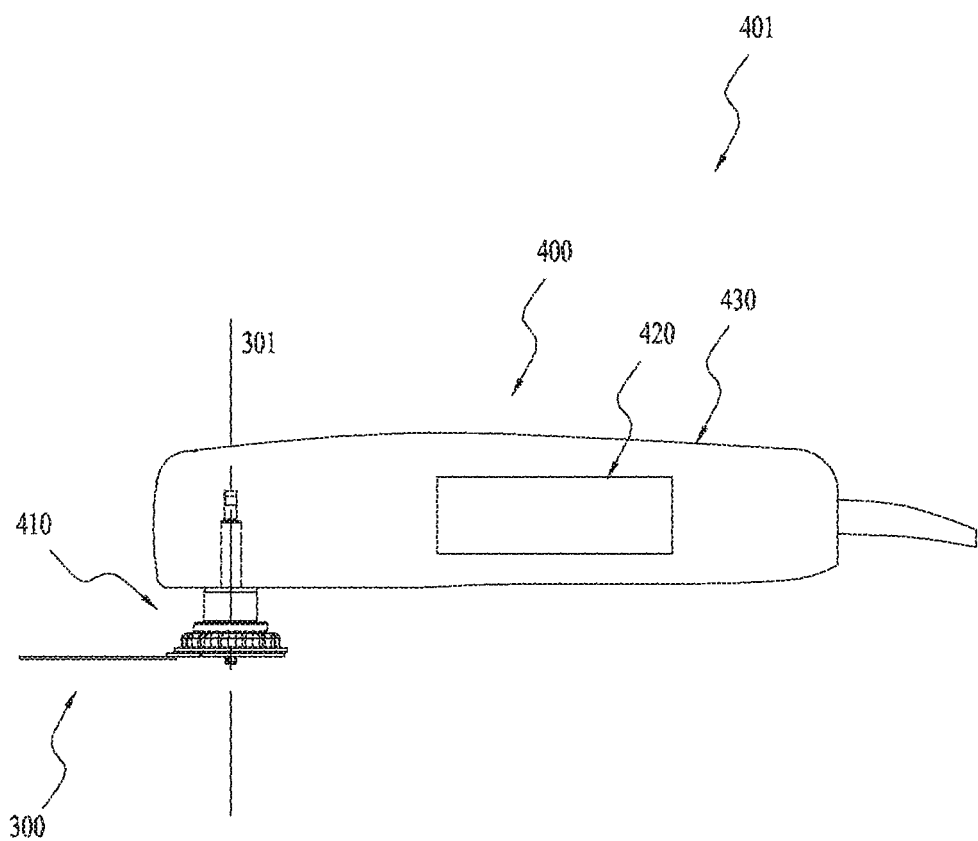
FIG. 11 is a schematic view of another example of a combination of a power tool and a working attachment.

As shown in FIG. 11, in a second example, a combination 401 includes a working attachment 300 and a power tool 400. The power tool 400 includes an attachment mounting device 410, a motor 420 and a handle 430.

The motor 420 is used to drive the attachment mounting device 410, and the working attachment 300 is mounted on the attachment mounting device 410. The attachment mounting device 410 is connected with the working attachment 300 so as to drive the working attachment 300 to oscillate around a central axis 301. The handle 430 is provided for a user to grip. Specifically, the power tool 400 is an oscillating tool.

Figure 12:
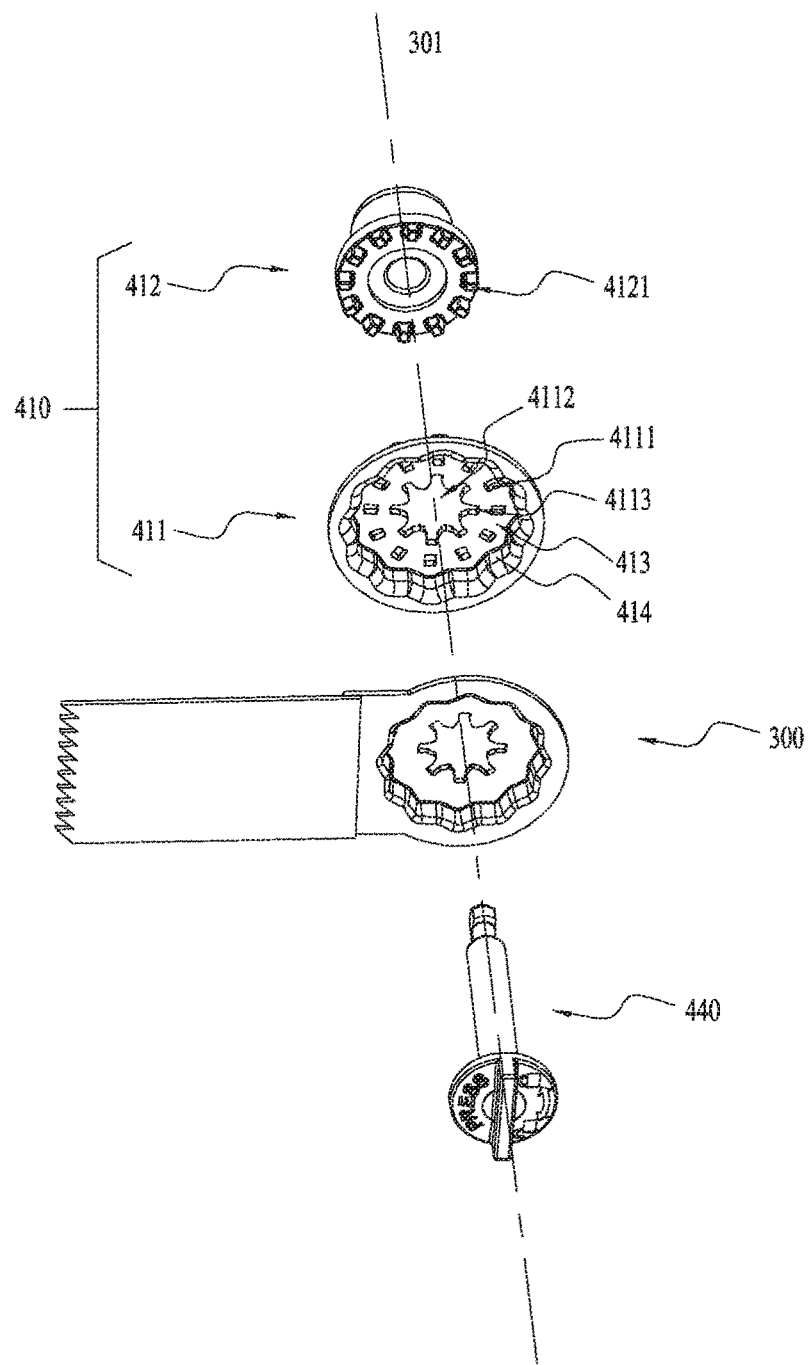
FIG. 12 is an exploded view of the working attachment and an attachment mounting device in FIG. 11.
Figure 13:
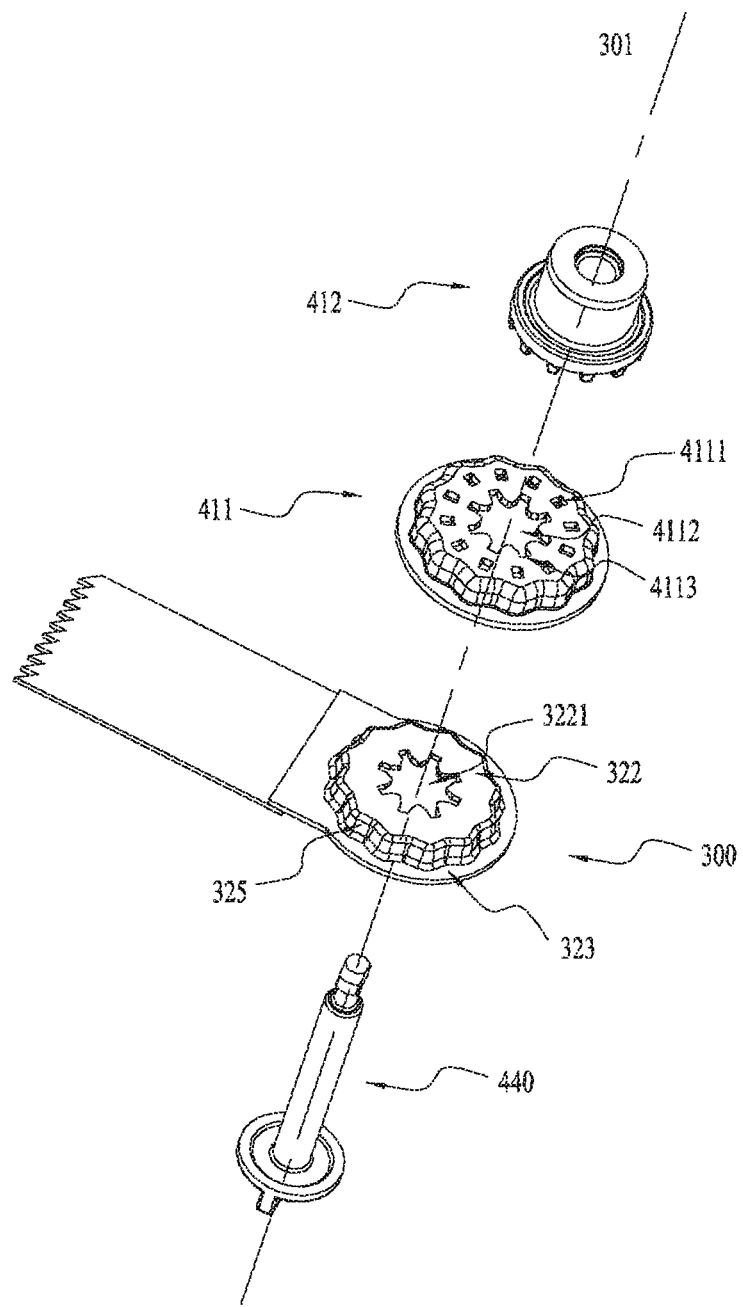
FIG. 13 is a further exploded view of the working attachment and the attachment mounting device in FIG. 11 from another perspective.
Figure 14:
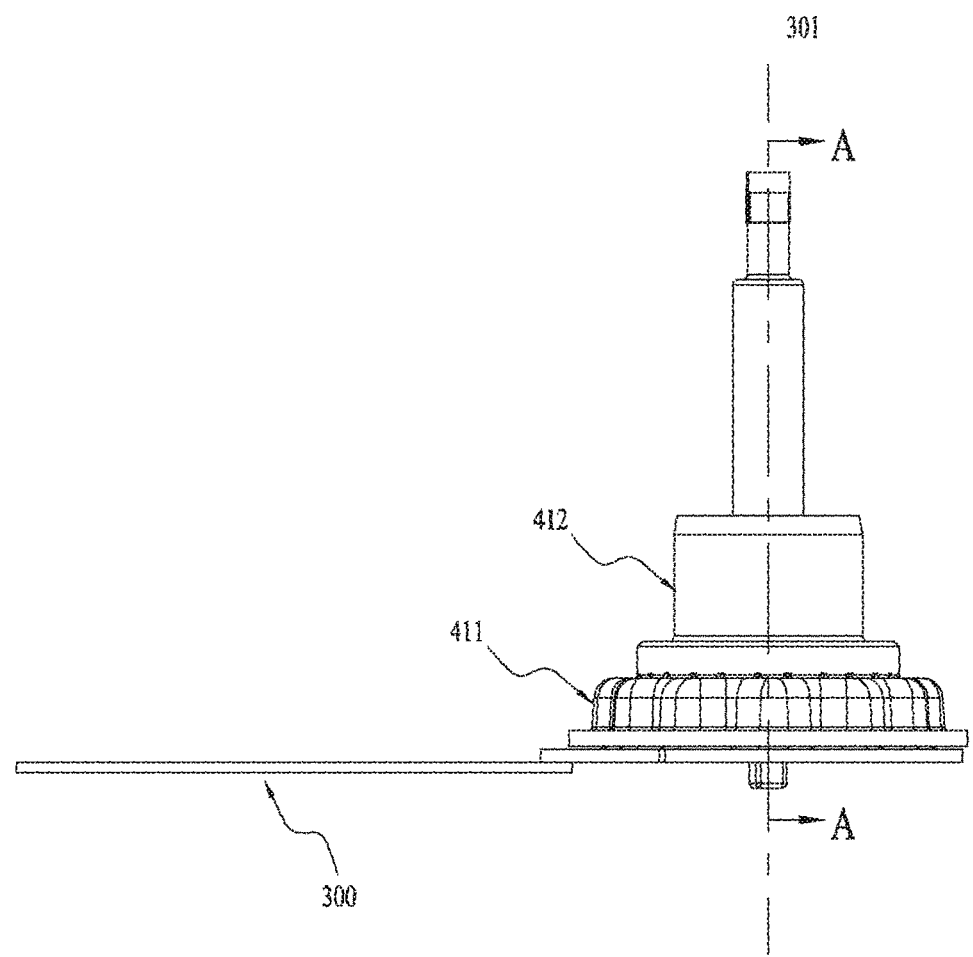
FIG. 14 is an assembly drawing of the working attachment and the attachment mounting device in FIG. 12.

Referring to FIGS. 11-12, the power tool 400 includes a locking element 440 for locking the working attachment 300 to the power tool 400. The locking element 440 is able to rotate relative to the handle 430. The locking element 440 can rotate around the central axis 301 for detaching or attaching the working attachment 300.

Referring to FIGS. 12-15, the attachment mounting device 410 includes an adaptor 411 and an attachment receiving device 412. The attachment receiving device 412 connects with and drives the adaptor 411. The adaptor 411 is formed with a recess 413 at its bottom which is extended toward the attachment receiving device 412 in a direction of the central axis 301.

The recess 413 accommodates a portion of the working attachment 300. The adaptor 411 includes driving surfaces 414 for contacting with and driving the working attachment 300. The driving surfaces 414 are formed by walls of the recess 413. In other embodiment, the adaptor 411 and the attachment receiving device 412 can be formed by one component. And the driving surfaces 414 of the attachment receiving device 412 can match with the driven surfaces of the working attachment 100 in FIGS. 3-7 so as to drive the working attachment 100 to oscillate.

The recess 413 accommodates a portion of the working attachment 300 so that the working attachment 300 can be connected with the power tool 400 more reliably and the working attachment 300 is not easily separated from the power tool 400. Otherwise, the driving surfaces 414 formed by the walls of the recess 413 can ensure the reliability of transmission and improve the service life of the transmission mechanism.

The attachment receiving device 412 includes an engaging structure which is constituted by a plurality of projections 4121. The plurality of projections 4121 is formed on the attachment receiving device 412, which is extended in the direction of the central axis 301.

The adaptor 411 includes a plurality of engaging holes 4111 for engaging with the plurality of projections 4121. The working attachment 300 is mounted on the attachment receiving device 412 through the adaptor 411. The adaptor 411 is so arranged that the power tool 400 can be used with more working attachments, such as the working attachment 100 in FIGS. 1-11.

The adaptor 411 can be adapted to different power tools with different engaging structures.

The adaptor 411 is formed with a first through hole 4112, and the central axis 301 passes through the first through hole 4112. The first through hole 4112 has a plurality of notches 4113 which are far from the central axis 301. The special structure of the first through hole 4112 makes the adaptor 411 able to be adapted for use with other power tools.

The working attachment 300 includes a top seat 322, a bottom seat 323 and a driven structure 325. The top seat 322 is close to the attachment mounting device 410 in the direction of the central axis 301, and the bottom seat 323 is far from the attachment mounting device 410 in the direction of the central axis 301. The top seat 322 and the bottom seat 323 have a height difference and form a step. The driven structure 325 is located between the top seat 322 and the bottom seat 323 in the direction of the central axis 301.

The top seat 322 is disposed in the recess 413. The driven structure 325 contacts with the driving surfaces 414. The driving surfaces 414 drive the driven structure 325 so as to realize the motion of the working attachment 300.

The working attachment 300 is formed with a second through hole 3221 which corresponds to the first through hole 4112. Specifically, the second through hole 3221 has the same shape as the first through hole 4112.

The locking element 440 can realize the fixation of the working attachment 300, the adaptor 411 and the attachment receiving device 412. To this end, the locking element 440 passes through the first and second through holes 4112, 3221 and fixes the working attachment 300 on the attachment mounting device 410. When it is needed to change the working attachment 300, the locking element 440 is released and removed, and the working attachment 300 can be separated from the adaptor 411.

Figure 15:
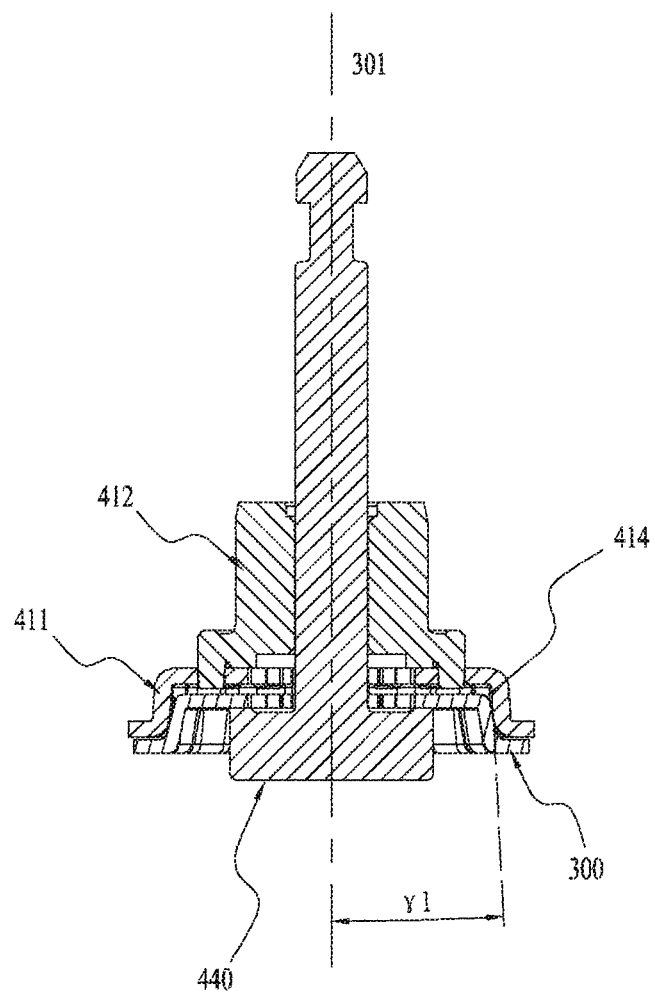
FIG. 15 is a sectional view of the structure in FIG. 14 along line A-A.

As shown in FIG. 15, an angle γ1 between a tangent line of a section of the driving surface 414 cut by a plane going through the central axis 301 and the central axis 301 is greater than or equal to 0 degree and less than or equal to 60 degrees. Further, the angle γ1 is greater than or equal to 0 degree and less than or equal to 5 degrees. The section of the driving surface 414 cut by the plane going through the central axis 301 may include an arc or a straight line. Specifically, the section includes a straight line. An angle between the straight line and the central axis 301 is greater than or equal to 0 degree and less than or equal to 5 degrees. As an embodiment, the driving surface 414 is substantially parallel to the central axis 301. In this situation, the angle γ1 between the tangent line of the section of the driving surface 414 cut by the plane going through the central axis 301 and the central axis 301 is 0 degree.

Figure 16:
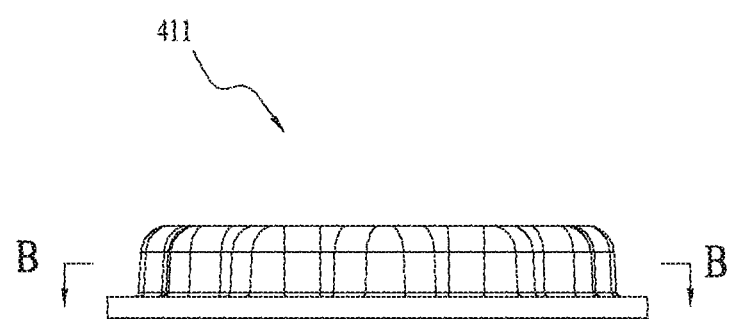
FIG. 16 is a plane view of an adaptor in FIG. 11.
Figure 17:
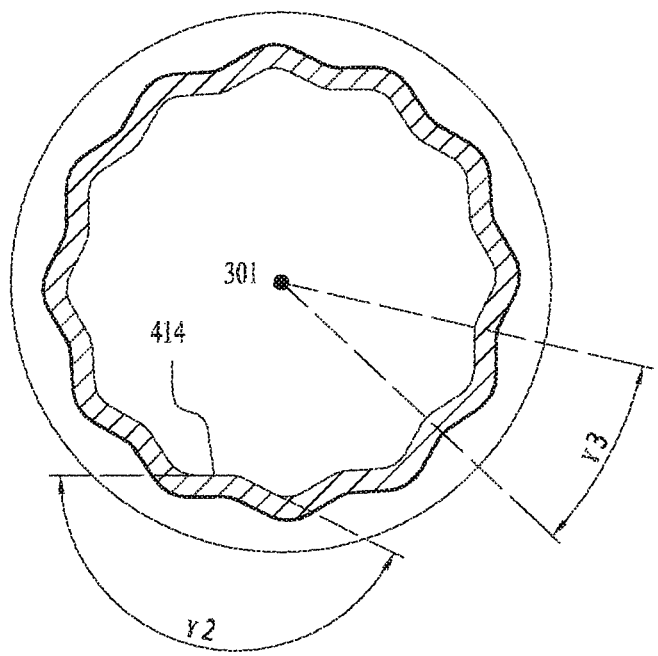
FIG. 17 is a sectional view of the adaptor in FIG. 16 along line B-B.

Referring to FIGS. 16-17, a section of two adjacent driving surfaces 414 cut by a plane which is perpendicular to the central axis 301 includes two lines. The two lines form an angle γ2 toward the central axis 301 which is greater than or equal to 150 degrees and less than or equal to 160 degrees. In this embodiment, the angle γ2 is 153 degrees.

The two lines or their extension lines intersect to form a convex point. An angle γ3 between two connecting lines respectively connecting each of two convex points and a section point of the central axis 301 on the plane is greater than or equal to 20 degrees and less than or equal to 40 degrees. In this embodiment, the angle γ3 is 30 degrees.

Figure 18:
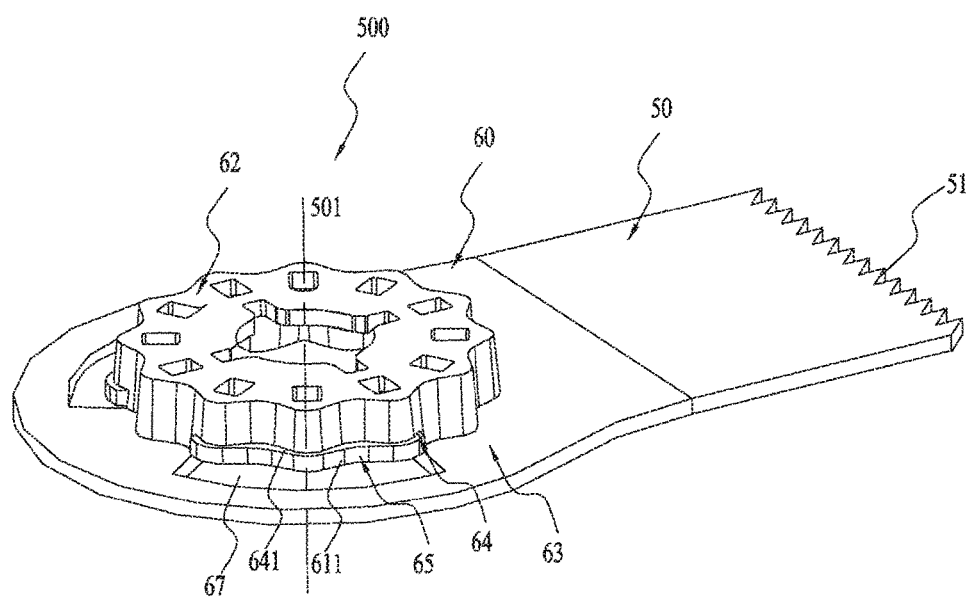
FIG. 18 is a schematic view of a further exemplary working attachment.
Figure 19:
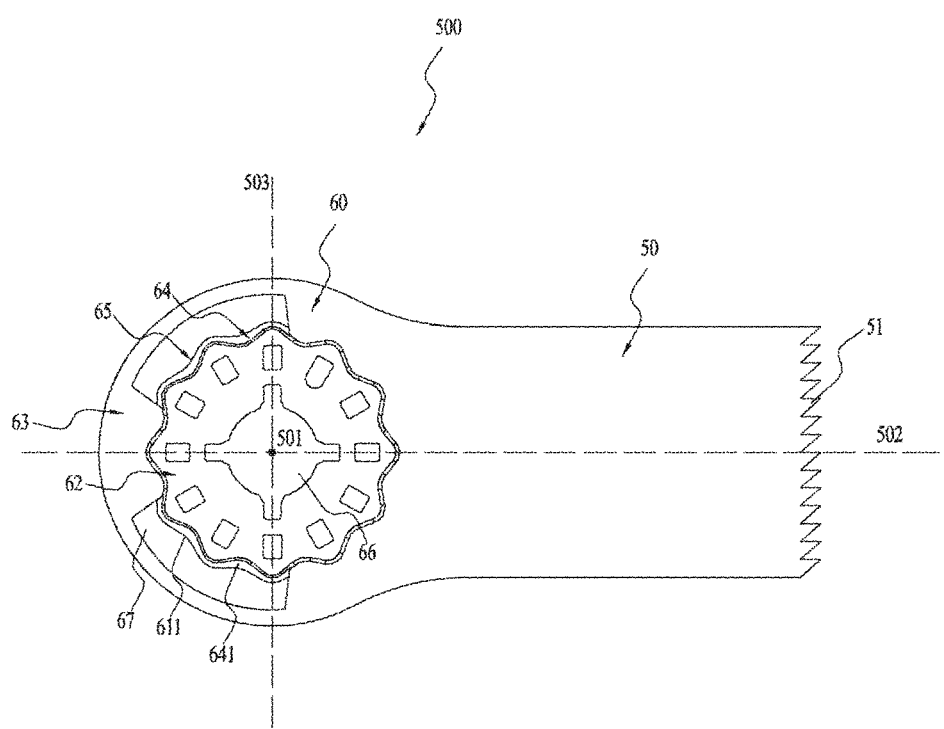
FIG. 19 is a top view of the working attachment in FIG. 18.

Referring to FIGS. 18-19, in a further example, a working attachment 500 is a saw blade which can be driven to oscillate around a central axis 501 by an oscillating tool. The working attachment 500 includes a working portion 50 for realizing the function of the working attachment 500 and a connecting portion 60 for connecting the working attachment 500 with a power tool. The working attachment 500 is provided with saw teeth 51 on its edge for realizing the function of sawing. The connecting portion 60 includes a top seat 62 that is able to contact with the power tool, a bottom seat 63 for connecting the working portion 50, a driven structure 65 including driven points being able to receive a driving force of the power tool and a step structure 64 arranged between the top seat 62 and the bottom seat 63. The step structure 64 includes a step surface 641 extending in a direction perpendicular to the central axis 501. The driven structure 65 includes driven surfaces 611 extending in a direction parallel to the central axis 501. The step surface 641 and the driven surfaces 611 intersect to form an intersecting ridge which is a set of the driven points. These driven points are disposed in a plane which is perpendicular to the central axis 501 and located between the top seat 62 and the bottom seat 63 in the direction of the central axis 501. The working attachment 500 is symmetrical relative to a first plane 502 and formed with a hole 66 on the top seat 62 for engaging with the power tool. The hole 66 is symmetrical relative to a second plane 503 which is perpendicular to the first plane 502 and goes through the central axis 501. An edge of the driven surfaces that is close to the bottom seat 63 does not contact with the bottom seat 63 so that a gap 67 is formed between the driven surfaces and the bottom seat 63. More than a half of the gap 67 is located on a side of the second plane 503 that is far from the working portion 50 so as to enhance the strength of the whole working attachment 500.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

What is claimed is:

1. A working attachment for a power tool, wherein the working attachment is able to be driven by the power tool to oscillate around a central axis, the working attachment comprising:
   a working portion for realizing a function of the working attachment; and
   a connecting portion for connecting the working attachment with the power tool, the connecting portion comprising at least two driven points for receiving a driving force of the power tool, the at least two driven points being disposed in a plane which is substantially perpendicular to the central axis and located between an upper end and a lower end of the connecting portion in a direction of the central axis,
   wherein the connecting portion comprises a driven surface for forming the driven points,
   wherein the connecting portion comprises a top seat for making the connecting portion be fixed relative to the power tool in the direction of the central axis and a bottom seat for fixedly connecting the working portion with the connecting portion, wherein the driven surface is arranged between the top seat and the bottom seat,
   wherein the top seat comprises a step structure which comprises a step surface extending in a direction substantially perpendicular to the central axis and the step surface intersects with the driven surface to form an intersecting ridge which is a set of driven points, and
   wherein in the direction of the central axis, lower edges of the driven surfaces do not contact with the bottom seat, and gaps are formed between the driven surface and the bottom seat in the direction of the central axis, and the gaps run through the bottom seat in a direction parallel to the central axis.

2. The working attachment of claim 1, wherein the an angle between the driven surface and the central axis is greater than or equal to 0 degree and less than or equal to 30 degrees.

3. The working attachment of claim 1, wherein the driven surface is extended in a direction parallel to the central axis.

4. The working attachment of claim 3, wherein the connecting portion comprises a plurality of the driven surfaces and at least two adjacent driven surfaces intersect to form an angle that protrudes outward in a radial direction.

5. The working attachment of claim 4, wherein the connecting portion comprises a plurality of the angles and a second angle between two connecting lines respectively connecting each endpoint of two adjacent ones of the plurality of angles and the central axis is greater than or equal to 20 degrees and less than or equal to 40 degrees.

6. The working attachment of claim 1, wherein the power tool is an oscillating tool and the working attachment is a saw blade adapted for use with the oscillating tool.

7. A working attachment for a power tool, wherein the working attachment is able to be driven by the power tool to oscillate around a central axis, the working attachment comprising:
   a working portion for realizing a function of the working attachment; and
   a connecting portion for connecting the working attachment with the power tool, the connecting portion comprising:
   a top seat for making the connecting portion be fixed relative to the power tool in a direction of the central axis;
   a bottom seat for fixedly connecting the working portion with the connecting portion, the bottom seat being formed with a hole through which the central axis passing; and
   a driven structure for receiving a driving force of the power tool so that the working attachment being capable of oscillating around the central axis,
   wherein the driven structure is arranged between the top seat and the bottom seat and a point of a projection of the driven structure on a plane substantially perpendicular to the central axis which is farthest from the central axis is located within a projection of the hole on the plane,
   wherein the top seat comprises a step structure which comprises a step surface extending in a direction substantially perpendicular to the central axis and the step surface intersects with the driven surface to form an intersecting ridge which is a set of driven points; and
   wherein in the direction of the central axis, lower edges of the driven surfaces do not contact with the bottom seat, so gaps are formed between the driven surface and the bottom seat in the direction of the central axis, and the gaps run through the bottom seat in a direction parallel to the central axis.

8. A combination, comprising:
   a power tool;
   a working attachment; and
   wherein the power tool comprises an attachment mounting device for connecting and driving the working attachment to rotate around a central axis and the working attachment comprises a working portion for realizing a function of the working attachment and a connecting portion for connecting the working attachment with the power tool, the connecting portion comprising at least two driven points for receiving a driving force of the power tool with the at least two driven points being disposed in a plane which is substantially perpendicular to the central axis and located between an upper end and a lower end of the connecting portion in a direction of the central axis, wherein the attachment mounting device comprises a recess for accommodating a portion of the working attachment and driving surfaces for contacting with the working attachment, wherein the driving surfaces are formed by walls of the recess and an angle between a tangent line of a section of the driving surfaces cut by a plane going through the central axis and the central axis is greater than or equal to 0 degree and less than or equal to 60 degrees, wherein the attachment mounting device comprises an adaptor for forming the recess and the driving surfaces, the adaptor being formed with a first through hole through which the central axis passing, and an attachment receiving device for connecting and driving the adaptor, and wherein the working attachment is formed with a second through hole which corresponds to the first through hole.

9. The combination of claim 8, wherein the connecting portion comprises driven surfaces for forming the driven points and an angle between each driven surface and the central axis is greater than or equal to 0 degree and less than or equal to 30 degrees.

10. The combination of claim 8, wherein the connecting portion comprises driven surfaces for forming the driven points which are extended in a direction parallel to the central axis.

11. The combination of claim 10, wherein the connecting portion comprises a top seat for making the connecting portion be fixed relative to the power tool in the direction of the central axis and a bottom seat for fixedly connecting the working portion with the connecting portion, wherein the driven surfaces are arranged between the top seat and the bottom seat.

12. The combination of claim 11, wherein the top seat comprises a step structure which comprises a step surface extending in a direction substantially perpendicular to the central axis and the step surface intersects with each driven surface to form an intersecting ridge which is a set of driven points.

13. The combination of claim 12, wherein a gap is formed between the driven surfaces and the bottom seat in the direction of the central axis.

14. The combination of claim 8, wherein the angle between the tangent line of the section of the driving surfaces cut by the plane going through the central axis and the central axis is greater than or equal to 0 degree and less than or equal to 5 degrees.

15. The combination of claim 8, wherein the section of two adjacent driving surfaces cut by the plane substantially perpendicular to the central axis comprises two lines, the two lines or their extension lines intersect to form a convex point, the attachment mounting device comprises a plurality of said convex points and, an angle between two connecting lines respectively connecting each of two convex points and a section point of the central axis on the plane is greater than or equal to 20 degrees and less than or equal to 40 degrees.

* * * * *